(12) United States Patent
Brooks et al.

(10) Patent No.: US 9,948,894 B2
(45) Date of Patent: Apr. 17, 2018

(54) VIRTUAL REPRESENTATION OF A USER PORTION

(71) Applicant: Hewlett-Packard Development Company, L.P., Houston, TX (US)

(72) Inventors: Robert C Brooks, Houston, TX (US); Kent E Biggs, Tomball, TX (US); Chi So, Spring, TX (US); Nam H Nguyen, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 15/522,006

(22) PCT Filed: Nov. 26, 2014

(86) PCT No.: PCT/US2014/067655
§ 371 (c)(1),
(2) Date: Apr. 26, 2017

(87) PCT Pub. No.: WO2016/085498
PCT Pub. Date: Jun. 2, 2016

(65) Prior Publication Data
US 2017/0324935 A1    Nov. 9, 2017

(51) Int. Cl.
*H04N 7/14* (2006.01)
*H04N 7/15* (2006.01)
*H04N 7/12* (2006.01)
*H04L 12/18* (2006.01)

(52) U.S. Cl.
CPC ............ *H04N 7/157* (2013.01); *H04L 12/18* (2013.01); *H04N 7/12* (2013.01); *H04N 7/15* (2013.01)

(58) Field of Classification Search
USPC ........................................... 348/14.01, 14.08
See application file for complete search history.

(56) References Cited

U.S. PATENT DOCUMENTS

| | | | |
|---|---|---|---|
| 2002/0041327 | A1 | 4/2002 | Hildreth et al. |
| 2004/0155902 | A1 | 8/2004 | Dempski et al. |
| 2006/0092267 | A1 | 5/2006 | Dempski et al. |
| 2008/0300010 | A1 | 12/2008 | Border et al. |
| 2009/0079816 | A1 | 3/2009 | Qvarfordt et al. |
| 2010/0073454 | A1 | 3/2010 | Lovhaugen et al. |
| 2010/0302138 | A1 | 12/2010 | Poot et al. |

(Continued)

FOREIGN PATENT DOCUMENTS

| CN | 102930447 A | 2/2013 |
|---|---|---|
| CN | 103838365 A | 6/2014 |

(Continued)

*Primary Examiner* — Quoc D Tran
(74) *Attorney, Agent, or Firm* — HP Inc. Patent Department (57) ABSTRACT

A device may include videoconferencing circuitry. The videoconferencing circuitry may access video data of a user captured through a camera. The videoconferencing circuitry may further determine, for the captured video data, that a user portion of the user is not in a field of view of the camera, such as the hand of the user. The videoconferencing circuitry may augment the video data to include a virtual representation of the user portion of the user and transmit the video data augmented with the virtual representation of the user portion to a remote videoconferencing device.

12 Claims, 9 Drawing Sheets

(56) References Cited

U.S. PATENT DOCUMENTS

| | | | |
|---|---|---|---|
| 2011/0316853 A1* | 12/2011 | Bar-Zeev | G06T 15/20 |
| | | | 345/420 |
| 2012/0117514 A1 | 5/2012 | Kim et al. | |
| 2013/0242262 A1 | 9/2013 | Lewis | |
| 2014/0132699 A1 | 5/2014 | Setton | |
| 2014/0226000 A1 | 8/2014 | Vilcovsky et al. | |
| 2014/0307920 A1* | 10/2014 | Holz | G06K 9/00335 |
| | | | 382/103 |
| 2016/0209930 A1* | 7/2016 | Bell | G06F 3/0488 |

FOREIGN PATENT DOCUMENTS

| | | |
|---|---|---|
| TW | 201437688 A | 10/2014 |
| WO | WO-2013/152454 A1 | 10/2013 |

\* cited by examiner

VIRTUAL REPRESENTATION OF A USER PORTION

BACKGROUND

Videoconferencing systems may include a number of remote devices linked together in a common videoconference session. Video data of the participants may be exchanged between the remote devices to support real-time communication and collaboration between the participants of the videoconference. Improving the quality of videoconferencing technologies may result in increased productivity and a better overall experience for videoconference participants.

BRIEF DESCRIPTION OF THE DRAWINGS

Certain examples are described in the following detailed description and in reference to the drawings.

DETAILED DESCRIPTION

The disclosure below may support display of virtual representation of a user portion in a videoconference, such as a virtual hand. By displaying a virtual representation of a user portion, remote videoconference participants may be able to more clearly see when, where, or how a local participant touches a display screen and even when the display screen is outside the field of view of a local camera capturing video data of the local participant. The virtual representation of a user portion may provide for enhanced experience for videoconference participants, which may result in increased productivity, collaboration, and clarity in communication.

Figure 1:
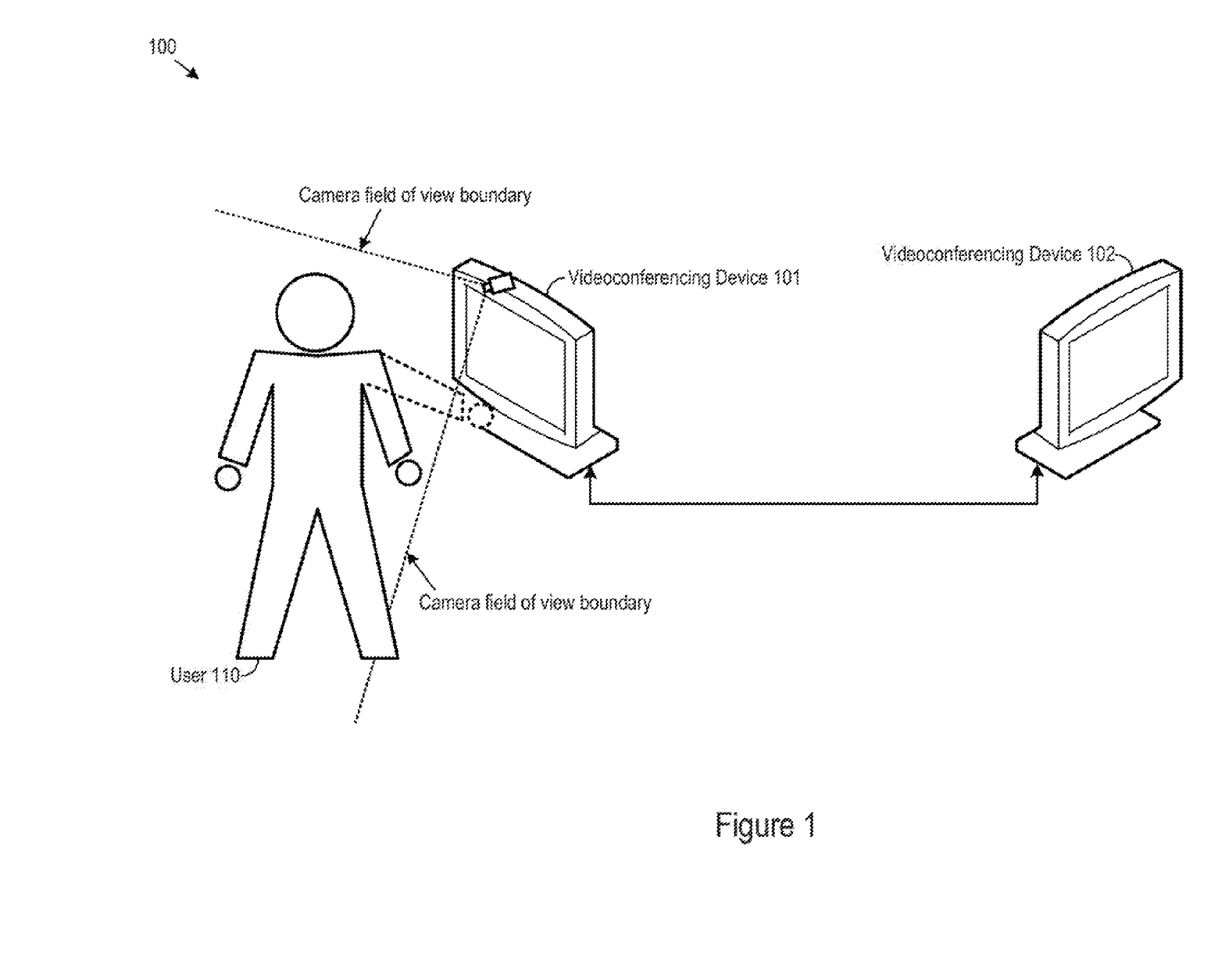
FIG. 1 shows an example of a videoconferencing system.

FIG. 1 shows an example of a videoconferencing system 100. The videoconferencing system 100 may support real-time communications of audio and/or video data between multiple devices. The example videoconferencing system 100 particularly shown in FIG. 1 includes the two videoconferencing devices labeled as 101 and 102. The videoconferencing devices 101 and 102 may be separate devices that are remote from one another, e.g., in different geographical locations, on different communication networks, in different rooms of a building, physically separate, etc. In a videoconference, the videoconferencing devices 101 and 102 may exchange audio and/or video data (A/V data) to virtually link multiple locations as well as users at the multiple locations, such as the user 110 for the videoconferencing device 101. In that regard, the videoconferencing device 101 may include circuitry to capture image and audio data of the user 110 and a communication interface to transmit the A/V data to the remote videoconferencing device 102. Simultaneously, the videoconferencing device 101 may receive A/V data from the remote videoconference device 102 for a remote user and present the received A/V data for the remote user through a user interface. The videoconferencing device 102 may include similar circuitry or logic to support capture and presentation of A/V data for the videoconference.

The videoconferencing devices 101 and 102 may be implemented as any electronic device that captures and presents A/V data. As examples, the videoconferencing devices 101 or 102 may be implemented as part of a laptop or desktop computer, an all-in-one computing device, a computer monitor or other display device, a tablet device, a mobile phone, a television or theater device, a dedicated conferencing device, an electronic wearable device, and more.

The videoconferencing system 100 may provide interactive options between participants of a videoconference. For instance, the videoconferencing system 100 may provide a common "clear" display for users to interact through. In that regard, devices of the videoconferencing system 100 may respectively present a "see-through screen" through which a user may see other videoconference participants as if they were co-located on different sides of a clear screen. The surface of the see-through screen may also serve as an interface through which the users interact, e.g., by drawing, writing, or otherwise marking the see-through screen. Thus, the videoconferencing device 101, 102, or both, may include touchscreen displays to track touch gestures and employ mirroring techniques to ensure the content marked or written on the see-through screen is intelligible to users of the example videoconferencing system 100. The videoconference devices 101 and 102 may present A/V data showing remote users In supporting a see-through screen implementation, the videoconferencing devices 101 and 102 may provide an indication or video data to a remote device indicative of when a local user engages (e.g., touches) a touchscreen display to mark the see-through screen. Depending on positioning, a camera of the videoconferencing device 101 or 102 may not be in a position to capture video data depicting the surface of a touchscreen display. In one example shown in FIG. 1, the hand of the user 110 exits the field of view of the camera when touching a touchscreen display of the videoconferencing device 101. As described in greater detail below, the videoconferencing device 101 may determine when a portion of a user (e.g., hand) exits, departs, or is not in the field of view of a camera and cause presentation of a virtual representation of the portion of the user on a remote videoconferencing device. The portion of the user may also be referred to as a user portion or specific user portion, and the videoconferencing circuitry 212 may cause a display of virtual representation of any number or combination of user portions. As one continuing example, the videoconferencing circuitry 212 specifically identifies a user portion as the hand of a user 110. Thus, a remote videoconference participant may be able to see a visualization of where the user 110 is engaging a touchscreen to mark the see-through screen, and even when the user's hand is outside the field of view of a camera that captures video data for the videoconference.

Figure 2:
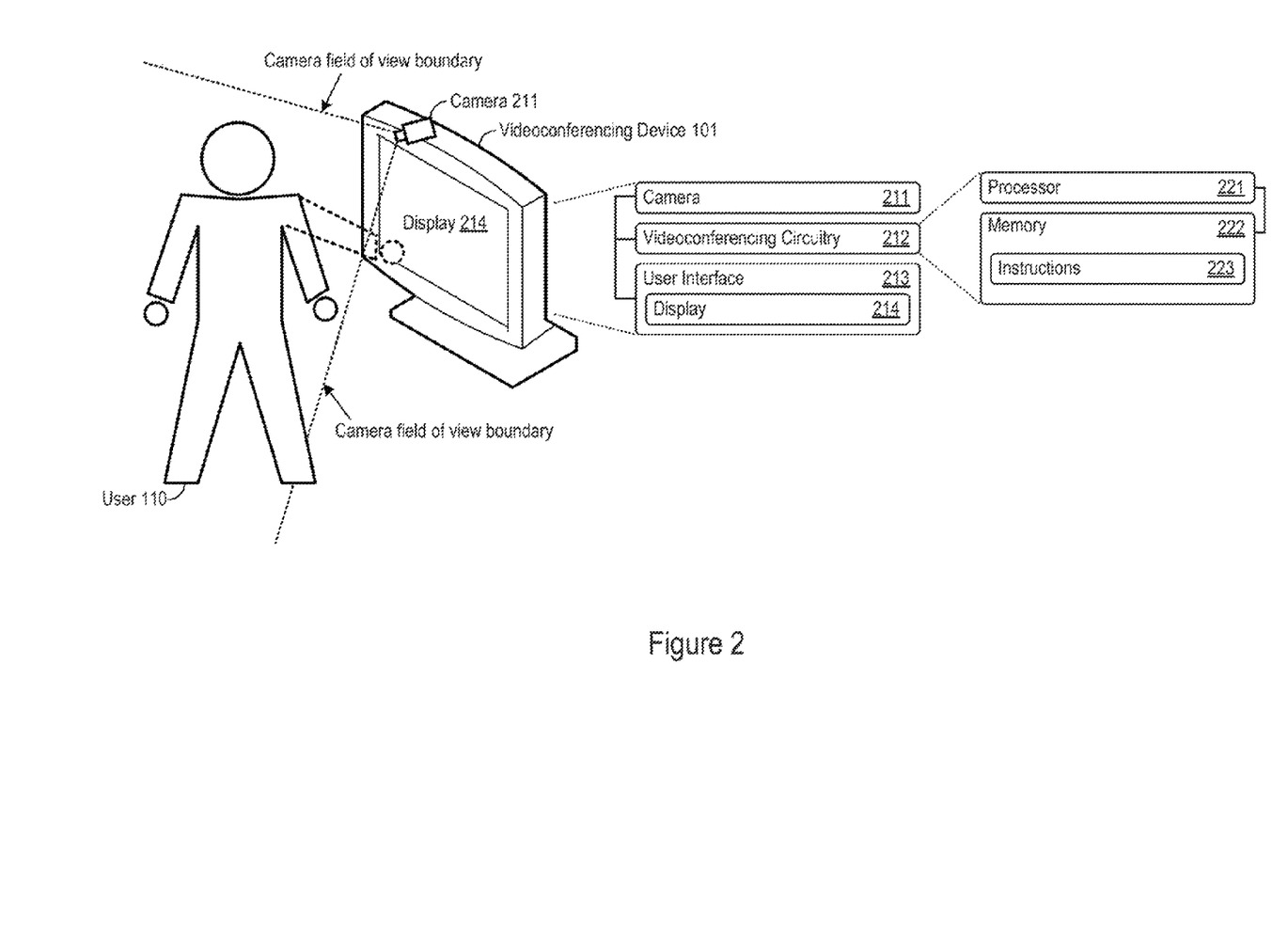
FIG. 2 shows an example of a videoconferencing device that supports presentation of a virtual representation of a user portion on a remote device.

FIG. 2 shows an example of a videoconferencing device 101 that supports presentation of a virtual representation of a user portion on a remote device. A virtual user portion may refer to a virtual representation or image of a specific portion of a user. The videoconferencing device 101 may include a camera 211. The camera 211 may capture image data as still image data, as video image data, or both. The camera 211 includes a field of view (or angle of view) which controls the extent of a particular scene that the camera 211 can capture image data for. In FIG. 2, example boundaries of the field of view of the camera 211 are shown through the dotted lines extending from the camera 211. The field of view of the camera 211 may vary depending on the characteristics of the camera 211, including circuitry specifications such as lens and digital sensor characteristics of the camera 211.

Another factor that may affect the field of view of the camera 211 is the positioning of the camera 211 on or in the videoconferencing device 101. The videoconferencing device 101 may include a user interface 213 that may include a display 214. In some implementations, the camera 211 is positioned along a perimeter of the display 214. Such an example is shown in FIG. 2, where the camera 211 is positioned on the upper-left side of the perimeter surrounding the display 214 of the videoconferencing device 101. Depending on the particular positioning of the camera 211 in the videoconferencing device 101, some or all of the display 214 may be out of the field of view of the camera 211. As a result, when the user 110 points, marks, touches, or otherwise engages a portion of the display 214 that is out of the field of view of the camera 211, the camera 211 may not capture the hand, fingers, pointing or marking device, or any other element used by the user 110 to engage the display 214. To address this out-of-camera-view engagement of the display 214 by the user 110, the videoconferencing device 101 may cause presentation of a virtual representation of the user's hand to allow remote videoconference users to see when, where and/or how the user 110 is engaging the display 214.

The videoconferencing device 101 may include videoconferencing circuitry 212 to support display of a virtual representation of a user portion on a remote videoconferencing device. In some implementations, the videoconferencing circuitry 212 includes a processor 221, a memory 222, or both. The processor 221 may be one or more central processing units (CPUs), microprocessors, and/or any hardware device suitable for executing instructions stored on the memory 222. The memory 222 may be any electronic, magnetic, optical, or other physical storage device that stores executable instructions, such as, the system instructions 124. Thus, the memory 122 may be, for example, Random Access Memory (RAM), an Electrically-Erasable Programmable Read-Only Memory (EEPROM), a storage drive, an optical disk, and the like.

The memory 222 may store instructions 223 that the processor 221 executes to perform any combination of the features described herein. In a continuing example, the videoconferencing circuitry 212 may identify the user portion as a hand of a user 110 or a portion of the user's hand. The videoconferencing circuitry 212 may determine when the hand of the user 110 is out of the field of view of the camera 211 and proximate to the display 214 (e.g., touching the display 214 or moving in a motion towards the display 214). In response, the videoconferencing circuitry 212 may cause presentation of a virtual representation of the user's hand on the remote videoconferencing device.

The videoconferencing circuitry 212 may determine when a user portion is out of the field of view of the camera 211 in various ways, some of which are described next. Any of the following example techniques may be performed by the videoconferencing circuitry 212 individually or in combination to make an out-of-camera-view determination for a user portion.

As one example, the videoconferencing circuitry 212 may perform an image analysis on captured video data to determine when the user portion is out of the field of view of the camera 211. To do so, the videoconferencing circuitry 212 may access captured video data to determine whether the user portion is present in the video data. The videoconferencing circuitry 212 may analyze the captured video data according to data that characterizes or identifies the user portion, such as a shape data or color data for the user portion. When the image analysis indicates the user portion (e.g., hand of the user 110) is not present the captured video data, the videoconferencing circuitry 212 may determine the user portion is not in the field of view of the camera 211.

Figure 3:
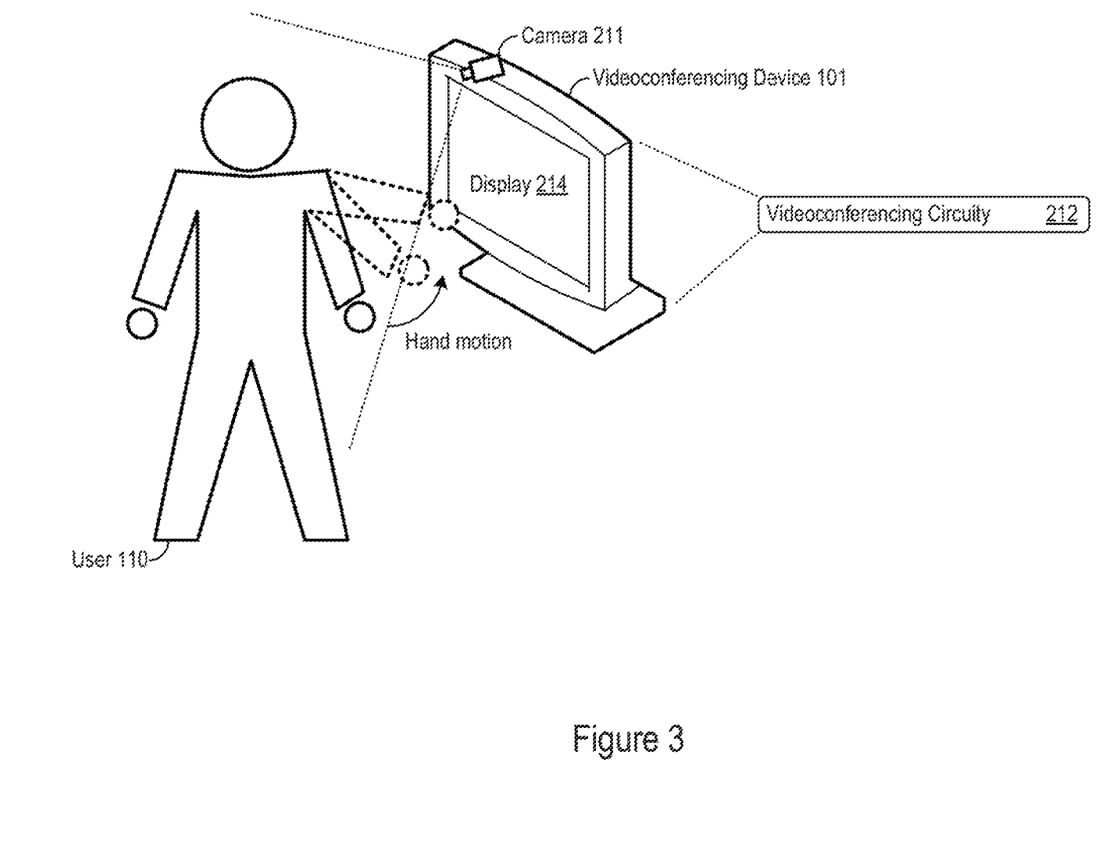
FIG. 3 shows another example of the videoconferencing circuitry performing motion analysis of a user.

As another example, the videoconferencing circuitry 212 may perform a motion analysis of the user 110 to determine when a user portion is out of the field of view of the camera 211. FIG. 3 shows an example of the videoconferencing circuitry 212 performing a motion analysis of the user 110. The videoconferencing circuitry 212 may analyze the captured video data to identify motions of the user 110. The camera 211 may include three-dimensional sensors, which may facilitate the videoconferencing circuitry 212 to identify the user portion in the video data, and track the user's motion in multiple dimensions. According to the motions of the user 110, the videoconferencing circuitry 212 may determine when the user portion moves from being in the camera field of view to out of the camera field of view. For example, as shown in FIG. 3, the hand of the user 110 may initially be in a position that is in the field of view of the camera 211. When the user 110 moves their hand in a motion towards the display 214, the user's hand may exit the field of view of the camera 211. The videoconferencing circuitry 212 may analyze the motion of the user's hand in video data captured by the camera 211, and accordingly determine the user's hand exiting the field of view of the camera 211. Put another way, the videoconferencing circuitry 212 may determine departure of the portion of the user 110 from the field of view of the camera 211 toward a display based on the motion analysis.

In performing the motion analysis, the videoconferencing circuitry 212 may utilize skeletal tracking to recognize portions of the user 110 in captured video data. For example, the videoconferencing circuitry 212 may analyze the captured video data and apply body models unto captured video data to detect a user portion of the user 110, e.g., specifically detect the hand of the user 110. Then, the videoconferencing circuitry 212 may continue to track the motion of the user portion to determine whether the user portion has exited the field of view of the camera 211. The videoconferencing circuitry 212 may use any combination of foreground segmentation, distance transforms, facial recognition, skin segmentation, and arm fitting techniques to build a skeletal model to track the user 110. In the particular example where the user portion is the user's hand, the videoconferencing circuitry 212 may use skeletal tracking to identify the elbow, wrist, and/or hand of the user 110, and thereby specifically track when the hand of the user 110 motions towards the display 214 and exits the field of view of the camera 211.

Figure 4:
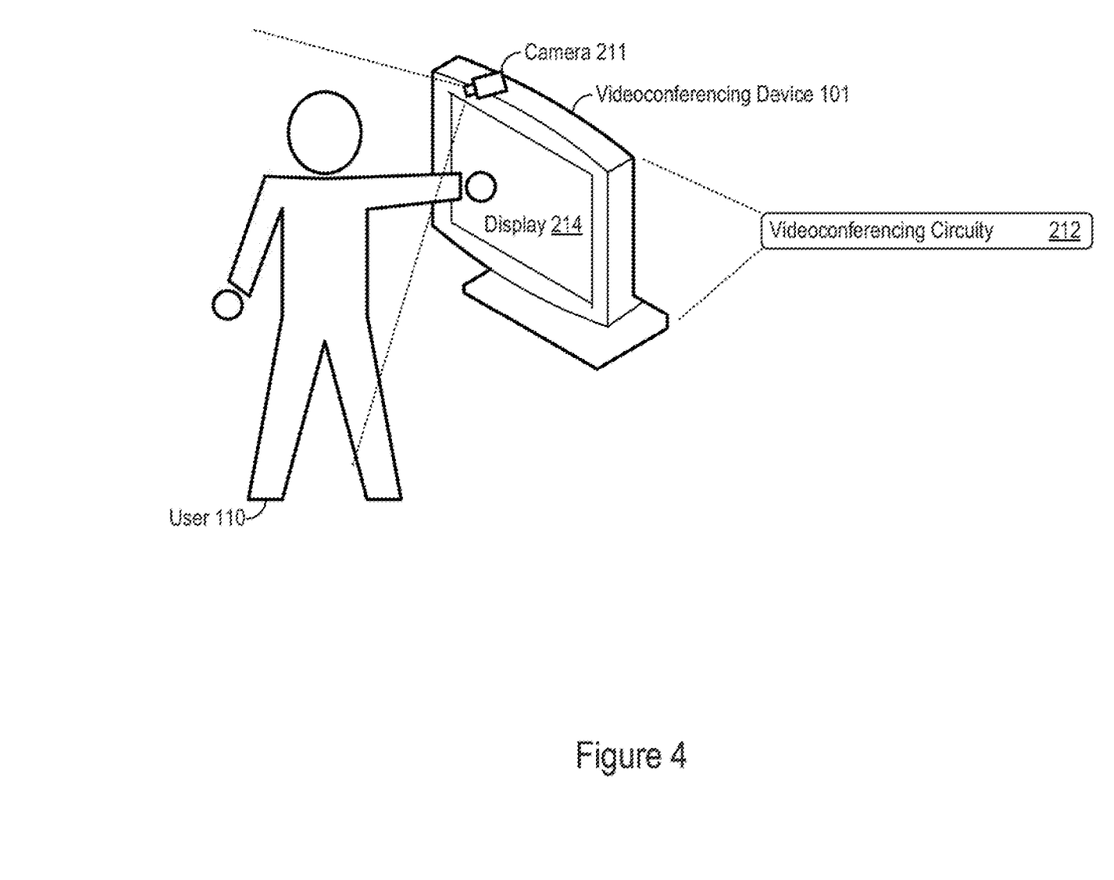
FIG. 4 shows another example of the videoconferencing circuitry performing a touch analysis of a display.

As yet another example, the videoconferencing circuitry 212 may perform a touch analysis to determine when a user portion is out of the field of view of the camera 211. FIG. 4 shows an example of the videoconferencing circuitry 212 performing a touch analysis of the display 214. The display 214 of the videoconferencing device 101 may be a touchscreen display that includes touch sensing capabilities. The videoconferencing circuitry 212 may determine when a touch gesture has occurred on the touchscreen display, such as a tap, double tap, swiping gesture, touches indicative of drawing, writing or marking the touchscreen display, multiple simultaneous touches, and any other type of touch gesture occurring on the touchscreen display. The videoconferencing circuitry 212 may also take into account the location of the touch gesture on the display, which may be referred to as a touch location. In some implementations, the field of view of the camera 211 may cover some, but not all, of the display 214. In these implementations, the videoconferencing circuitry 212 may determine whether the touch gesture occurs at a portion of the display 214 out of the field of view of the camera 211 according to the touch location on the display 214 where the touch gesture occurs. In implementations where the display 214 is out of the field of view of the camera 214, the videoconferencing circuitry 212 may determine the user portion is out of the camera field of view upon detecting any touch gesture on the touchscreen display 214.

In the example shown in FIG. 4, the hand of the user 110 touches the display 214 and at a point of the display 214 outside the field of view of the camera 211. In response to recognizing the touch gesture, the videoconferencing circuitry 212 may determine that the user portion (e.g., the user hand) is outside the field of view of the camera 211. In response, the videoconferencing circuitry 212 may cause presentation of a virtual representation of the user hand on a remote videoconferencing device.

While some out-of-camera-view determination techniques have been presented above, the videoconferencing circuitry 212 may alternatively or additionally apply any number of video analysis techniques to determine when the user portion is not in the field of view of the camera 211. As part of the out-of-camera-view determination, the videoconferencing circuitry 212 may further analyze when a user portion out of the field of view of the camera 211 is proximate to the display 214. Proximity to the display 214 may refer to when the user portion is in the area between the field of view of the camera 211 and the display 214, and thus presentation of a virtual representation of the user portion would help a remote videoconference participate to more clearly see when and where the user 110 engages (e.g., touches) the display 214. The videoconferencing circuitry 212 may make such a proximity determination in conjunction with the image, motion, and touch analysis techniques discussed above, for example by identifying user hand motions toward the display 214 or detecting touch gestures on the touchscreen of the display 214.

Figure 5:
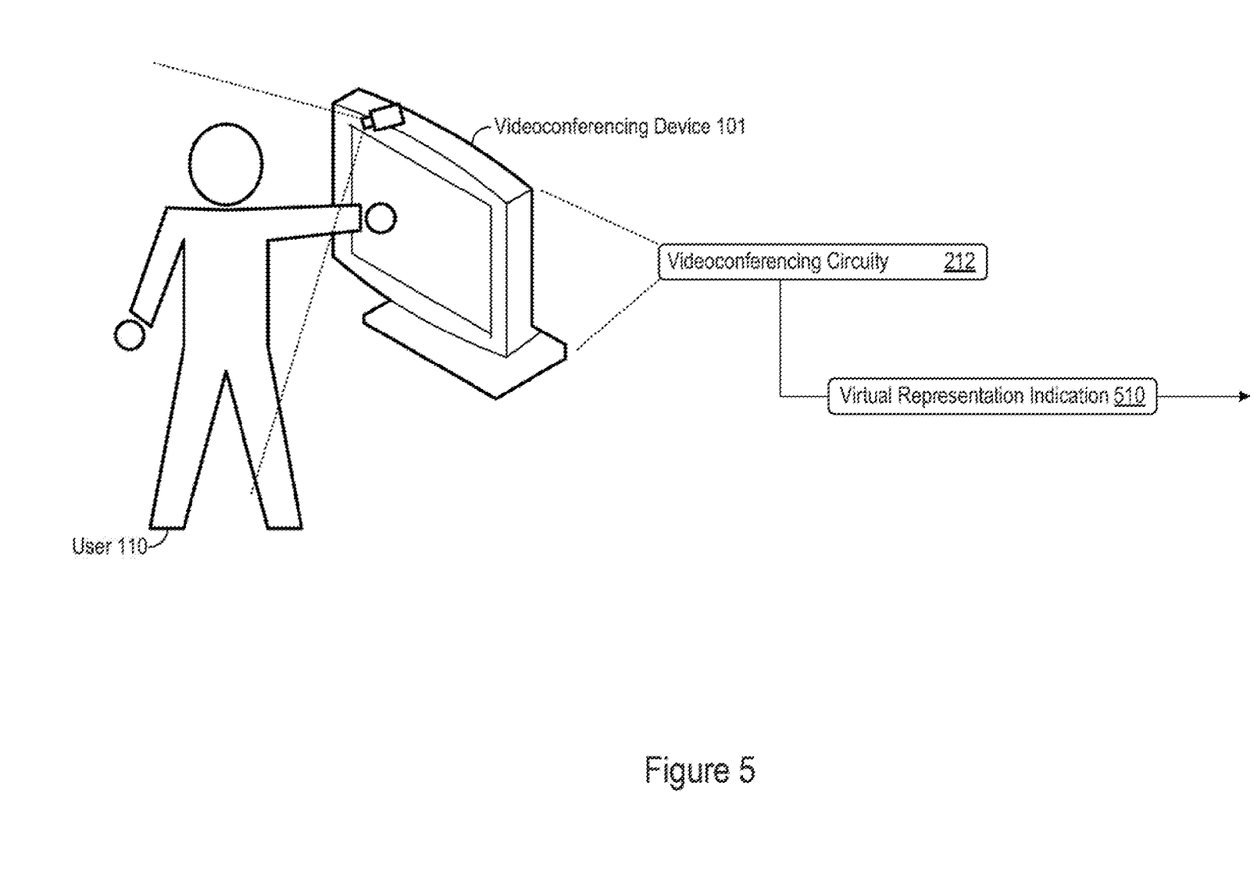
FIG. 5 shows an example communication that videoconferencing circuitry may transmit to cause presentation of a virtual representation of a user portion on a remote videoconferencing device.

FIG. 5 shows an example communication the videoconferencing circuitry 212 may transmit to cause presentation of a virtual representation of a user portion on a remote videoconferencing device. Upon determining a user portion is out of the field of view of the camera 211 and proximate to the display 214, the videoconferencing circuitry 212 may send a virtual representation indication 510 to a remote videoconferencing device, e.g., the videoconferencing device 102.

The virtual representation indication 510 may take different forms. In some implementations, the videoconferencing circuitry 212 may transmit video data captured by the camera to the remote videoconferencing device without the user portion shown in the video data. In these implementations, the videoconferencing circuitry 212 may transmit the virtual representation indication 510 as a message, code, or other data communication instructing or otherwise causing the remote videoconferencing device to present a virtual representation of the user portion of the user with the transmitted video data. The virtual representation indication 510 may be flag bit set in an A/V data stream or specified through a custom field in A/V packet data transmitted to the remote videoconferencing device.

In some implementations, the videoconferencing circuitry 212 may augment the video data to include a virtual representation of the user portion of the user 110. In these implementations, the videoconferencing circuitry 212 may generate the virtual representation and overlay the generated virtual representation into the video data itself. For example, the videoconferencing circuitry 212 may use avatar technology to generate the virtual representation, which may take the form of a virtual hand of a user. The virtual representation may be a three-dimensional representation that mimics the movement, shape, color, and position of the user portion when out of the field of view of the camera 211.

The videoconferencing circuitry 212 may control one or more characteristics of the virtual representation of the user portion to mimic the actual user portion of the user 110. In that regard, the videoconferencing circuitry 212 utilize captured video data, touchscreen data, sensor data (e.g., sound, light, or other area characteristics), or any other environmental data to identify or predict one or more visual characteristics of the user portion. A visual characteristic may specify a color, shape, and/or position of the user portion. Accounting for these identified or predicted visual characteristics, the videoconferencing circuitry 212 may more accurately represent the user portion displayed on the remote videoconferencing device through the virtual representation.

The videoconferencing circuitry 212 may identify a visual characteristic by analyzing captured video data. For instance, the videoconferencing circuitry 212 may obtain captured camera data with the user portion in the field of view of the camera 211 and identify a visual characteristic of the user portion in the captured camera data. The captured camera data may include video data where the user portion is in the field of view of the camera 211. Accordingly, the videoconferencing circuitry 212 may extract color, texture, shape, shading, or other visual data of the user portion and/or surrounding elements, such as clothing adjacent to a user's hand, a pointing or marking device, e.g., a stylus, and more.

The videoconferencing circuitry 212 may identify or predict a visual characteristic of the user portion by identifying a touch characteristic of one or more touch gestures on the display 214. A touch characteristic may refer to a touch location on the display 214 of the touch gesture, time duration of the touch gesture, pressure exerted in a touch gesture, speed and/or frequency of touches, multiple simultaneous touches on the touchscreen display, the number of the multiple simultaneous touches, a distance between multiple touches on the touchscreen display, or any other data characterizing a touch gesture. According to the touch location of the touch gesture, the videoconferencing circuitry 212 may determine a location (e.g., in a video frame) at which to render the virtual representation of the user portion.

Accounting for the touch gesture, the videoconferencing circuitry 212 may predict a shape of the user portion. For the continuing example of a user hand, the videoconferencing circuitry 212 may predict the shape of the user's hand according to an identified touch characteristic. According to the touch location of the touch gesture, the videoconferencing circuitry 212 may predict the extent to which the user's finger(s), hand, elbow, or wrist extend to reach the particular position, and thus predict a shape of the user's fingers, hand, wrist, elbow, or other portion. For multiple simultaneous touches, the videoconferencing circuitry 212 may predict whether the multiple touches originate from the one or two hands of the user 110. For example, the videoconferencing circuitry 212 may apply a distance threshold to make this prediction. When the distance between the multiple touches on the display is less than the distance threshold, the videoconferencing circuitry 212 may predict the multiple touch gestures occur through one of the user's hand. When the distance exceeds the distance threshold, the videoconferencing circuitry 212 may predict the multiple touch gestures occur through two hands. The videoconferencing circuitry 212 may additionally or alternatively apply distance ranges for such a prediction, and may similarly use these techniques to predict which fingers of a user's hand originate the multiple touch gestures.

Upon determining one or more visual characteristics of the user portion, the videoconferencing circuitry 212 may transmit the visual characteristics to the remote videoconferencing device. The visual characteristics may include color data, positional data, three-dimensional shape data, and any other data to guide the remote videoconferencing device in rendering the virtual representation of the user portion. In some implementations, the videoconferencing circuitry 212 may instead render the virtual representation of the user portion locally according to the determined visual characteristics, augment captured video data without the user portion with the generated virtual representation, and transmit the augmented video data to the remote videoconferencing device for presentation.

Figure 6:
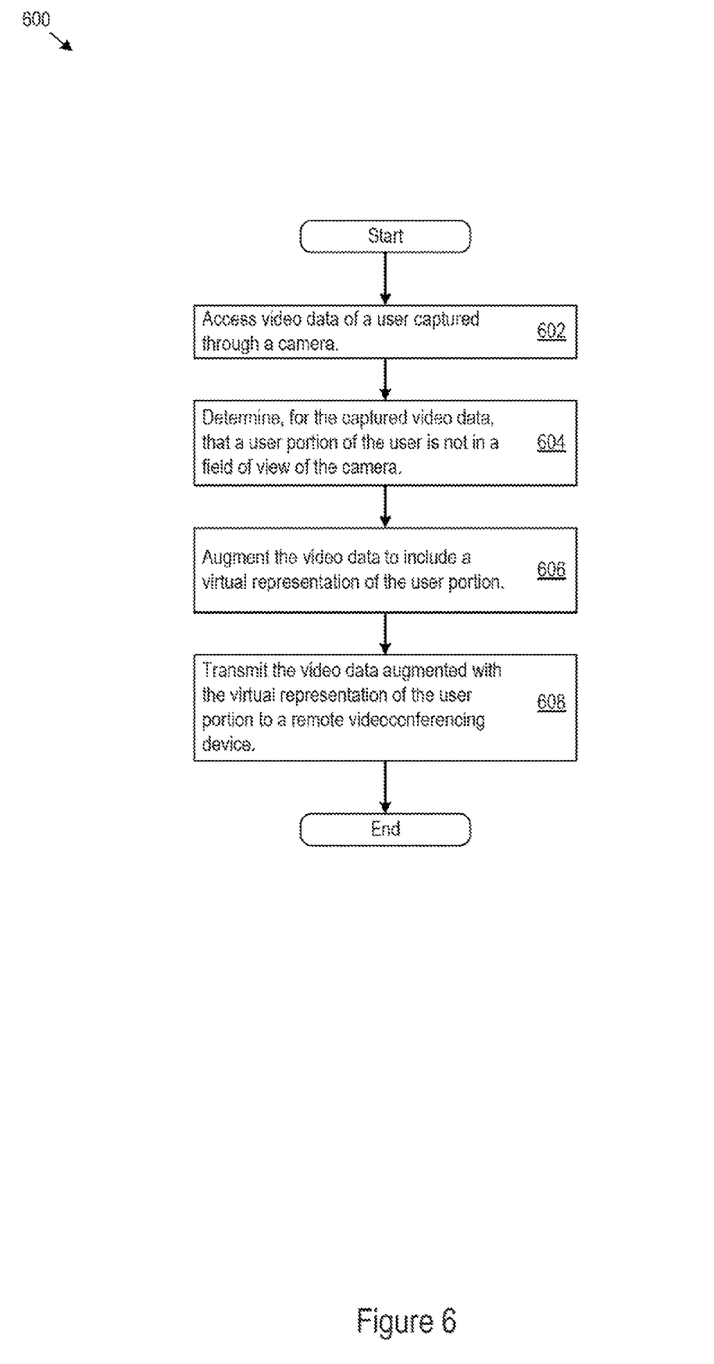
FIG. 6 shows an example of logic that videoconferencing circuitry may implement to support presentation of a virtual user portion.

FIG. 6 shows an example of logic 600 the videoconferencing circuitry 212 may implement to support presentation of a virtual representation of a user portion on a remote videoconferencing device. The videoconferencing circuitry 212 may implement the logic 600 as hardware, software, or a combination of both, for example as a machine readable medium (e.g., the memory 242) storing processor executable instructions (e.g., the instructions 223).

The videoconferencing circuitry 212 may access video data of a user captured through a camera 211 (602) and determine, for the captured video data, that a user portion of the user is not in the field of view for the camera (604). The videoconferencing circuitry 212 may use any combination of the out-of-camera-view determination techniques discussed herein. The videoconferencing circuitry 212 may further determine when the user portion is out of camera view and proximate to a display 214, e.g., touching the display 214, motioning towards the display 214, or otherwise in the space between the camera field of view and the display 214.

The videoconferencing circuitry 212 may augment the video data to include a virtual representation of the user portion (606), such as by overlaying the virtual representation of the user portion unto the video data. The videoconferencing circuitry 212 may account for any number of visual characteristics of the user portion, and may thus increase the accuracy in which the virtual representation depicts the user portion. The videoconferencing circuitry 212 may augment the video data by identifying, from previously captured video data, a visual characteristic of the user portion and generating the virtual representation of the user portion to include or account for the visual characteristic. Additionally or alternatively, the videoconferencing circuitry 212 may identify a touch gesture has occurred on the display 214, which may be a touchscreen display. In response, the videoconferencing circuitry 212 may identify a touch characteristic of the touch gesture. Based on the touch characteristic, the videoconferencing circuitry 212 may determine a touch location of the user portion that is not in the field of view of the camera 211, predict a shape of the user portion that is not in the field of view of the camera 211, or both. The videoconferencing circuitry 212 may generate a virtual representation of the user portion at the touch location and/or in the predicted shape.

The videoconferencing circuitry 212 may transmit the video data augmented with the virtual representation of the user portion to a remote videoconferencing device (608). This may be one form of a virtual representation indication 510 the videoconferencing circuitry 212 may send. In other implementations, the videoconferencing circuitry 212 may transmit the video data without the virtual representation, and may instead send a virtual representation indication 510 as an instruction, flag, code, or other message directing the remote videoconferencing device to render the virtual representation of the user portion with the video data. In these implementations, the videoconferencing circuitry 212 may additionally send any number of the visual characteristics discussed herein to guide the remote videoconferencing device in rendering the virtual representation of the user portion.

Figure 7:
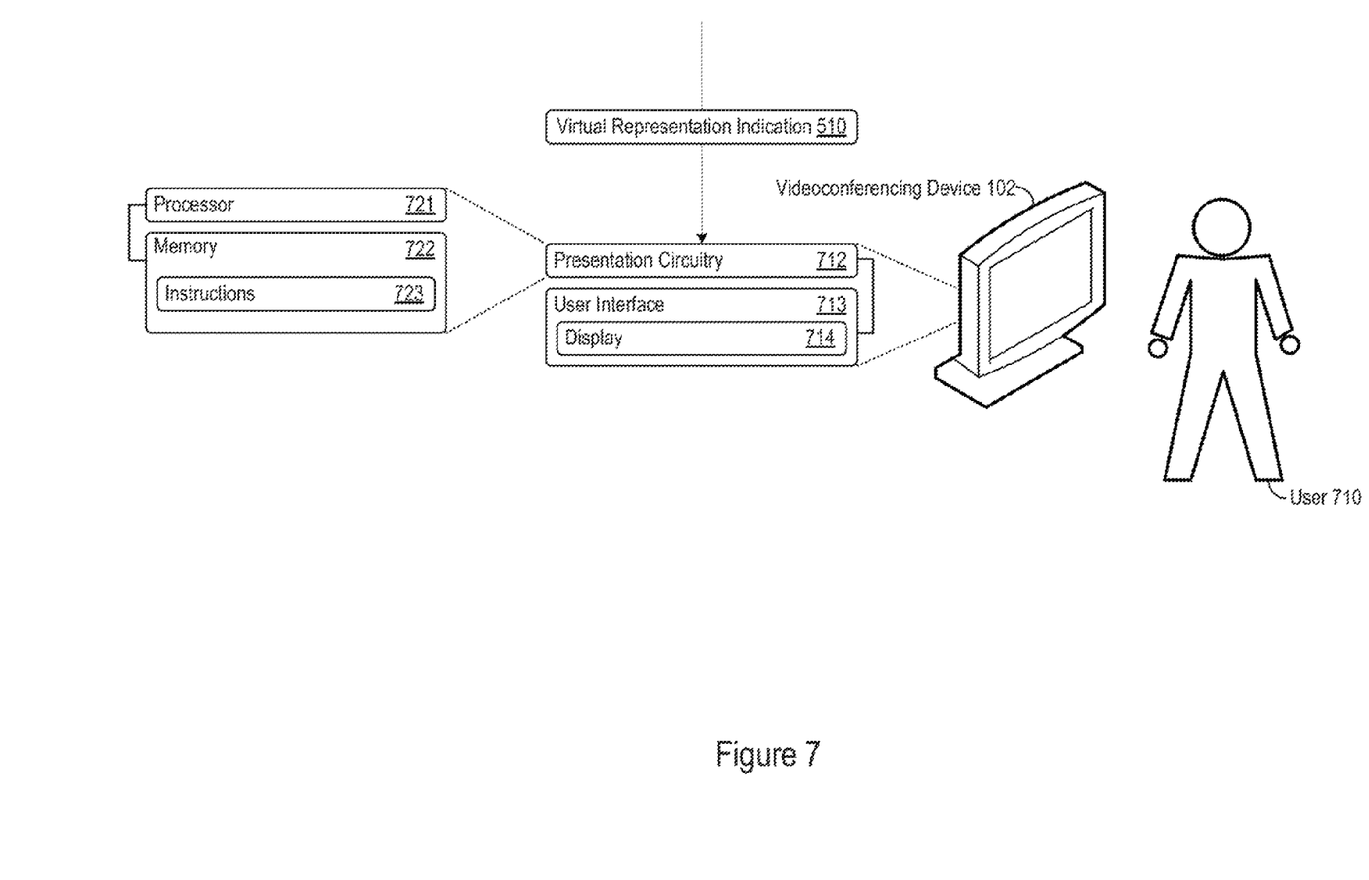
FIG. 7 shows an example of a videoconferencing device that presents a virtual representation of a user portion.

FIG. 7 shows an example of a videoconferencing device 102 that presents a virtual representation of a user portion of a remote user. The videoconferencing device 102 may include a presentation circuitry 712 to support the presentation of the virtual representation. In some implementations, the presentation circuitry 712 includes a processor 721 and/or a memory 722. The memory 722 may store instructions 723 that the processor 721 executes to perform any of the features discussed herein. The videoconferencing device 102 may include a user interface 713 that includes a display 714 through which to present the virtual representation, for example to a user 710 of the videoconferencing device 102.

The presentation circuitry 712 of the videoconferencing device 102 may receive a virtual representation indication 510 from another device remote to the videoconferencing device 102. The virtual representation indication 510 may specify that a hand portion of a remote user is out of a field of view of a remote camera of the remote device, for example as discussed above. In response to receiving the virtual representation indication 510, the presentation circuitry 712 may present a virtual representation of a user portion of a remote user as specified by the virtual representation indication 510. When the user portion is a hand portion of the remote user, the presentation circuitry may present, through the user interface 713, a virtual hand representation for the remote user in order to account for the hand portion that is out of the field of view of the remote camera.

In some implementations, the presentation circuitry 712 receives the virtual presentation indication 510 as video augmented to include the virtual hand representation. In that regard, the presentation circuitry 712 may present a virtual hand representation by displaying the received video data. In other implementations, the presentation circuitry 712 receives the virtual presentation indication 510 as an instruction, code, or message to render a virtual representation of a user portion of the remote user with received video data. The presentation circuitry 712 may additionally receive one or more visual characteristics of the user portion (e.g., hand portion) of the remote user that is out of the field of view of the remote camera, including any of the visual characteristics discussed above. The presentation circuitry 712 may then present the virtual representation according to the received visual characteristics.

Figure 8:
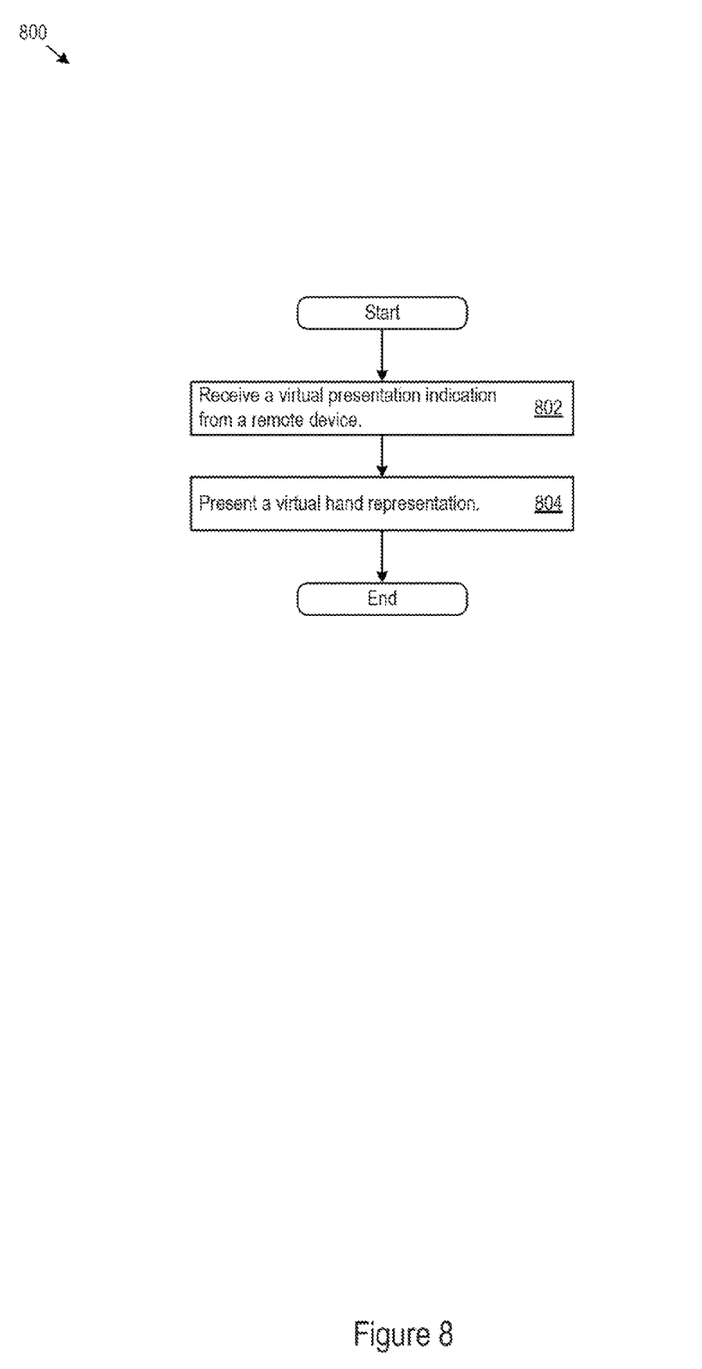
FIG. 8 shows an example of logic that the presentation circuitry may implement to present a virtual representation of a user portion.

FIG. 8 shows an example of logic 800 that the presentation circuitry 712 may implement to present a virtual representation of a user portion of a remote user. The presentation circuitry 712 may implement the logic 800 as hardware, software, or a combination of both, for example as a machine readable medium (e.g., the memory 722) storing processor executable instructions (e.g., the instructions 723).

The presentation circuitry 712 may receive a virtual representation indication from a remote device, the virtual representation indication specifying that a hand portion of a remote user is out of a field of view of a remote camera of the remote device (802). As discussed above, the virtual representation indication may take the form of video data augmented with the virtual representation of the user portion or as a code, instruction, packet field, flag, or other indication to virtually represent a user portion in video data. The presentation circuitry 712 may interpret the virtual representation indication and/or accompanying visual characteristics according to the specific form the virtual representation indication is received as. Then, the presentation circuitry 712 may present, on a user interface, a virtual hand representation for the remote user in order to account for the hand portion that is out of the field of view of the remote camera (804).

Figure 9:
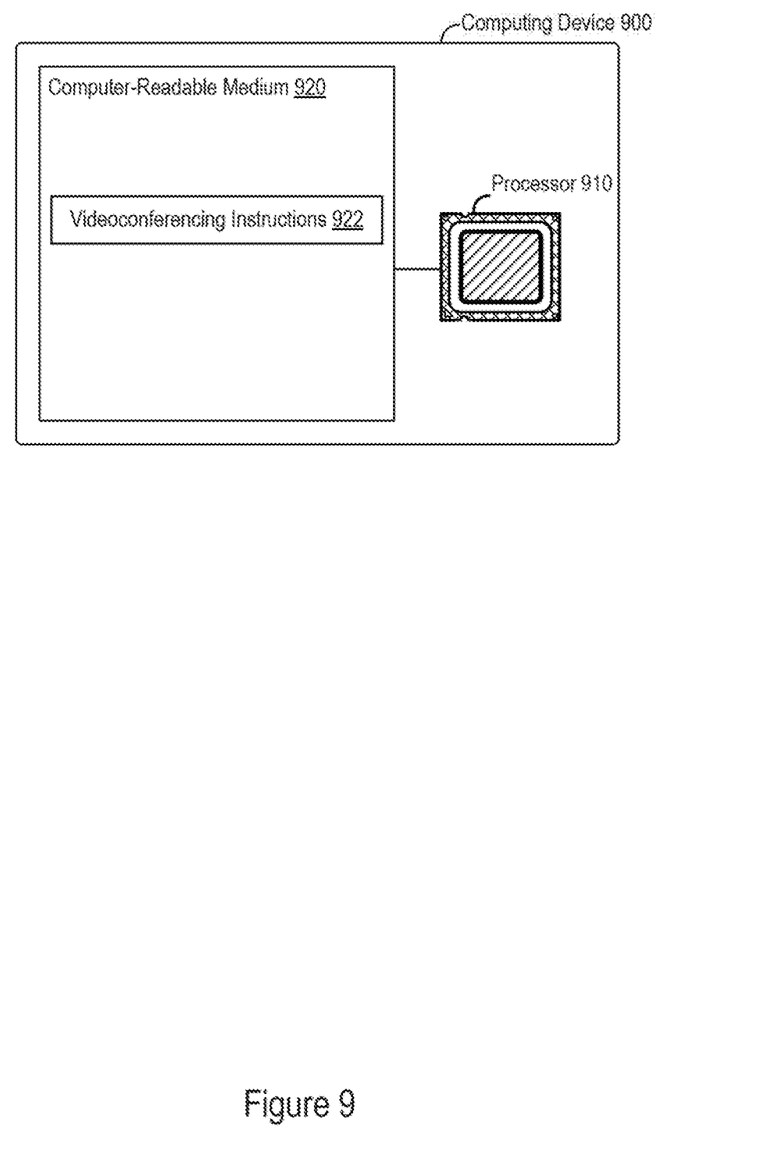
FIG. 9 shows an example of a computing device that supports presentation of a virtual representation of a user portion.

FIG. 9 shows an example of a computing device 900 that supports presentation of a virtual representation of a user portion. The computing device 900 may implement In that regard, the computing device 900 may implement any of the functionality described herein, including any functionality of the videoconferencing circuitry 212, the presentation circuitry 712, or a combination both. The computing device 900 may include a processor 910. The processor 910 may be one or more central processing units (CPUs), microprocessors, and/or any hardware device suitable for executing instructions stored on a computer-readable medium (e.g., a memory).

The computing device 900 may include a computer-readable medium 920. The computer-readable medium 920 may be any electronic, magnetic, optical, or other physical storage device that stores executable instructions, such as the videoconferencing instructions 922 shown in FIG. 9. Thus, the computer-readable medium 920 may be, for example, Random Access Memory (RAM), an Electrically-Erasable Programmable Read-Only Memory (EEPROM), a storage drive, an optical disk, and the like.

The computing device 900 may execute instructions stored on the computer-readable medium 920 through the processor 910. Executing the instructions may cause the computing device 900 to perform any of the features described herein. One specific example is shown in FIG. 9 through the videoconferencing instructions 922. Executing the videoconferencing instructions 922 may cause the computing device 900 to perform any combination of the functionality of the videoconferencing circuitry 212 described above, such as determine that a user portion of a user is not in a field of view of a camera and transmitting a virtual representation indication to a remote videoconferencing device to cause a virtual representation of the user portion of the user to be presented. The computing device 900 may thus support a remote videoconference participant to see a visualization of where a user is engaging a touchscreen to mark a see-through screen, and even when the user's hand is outside the field of view of a camera that captures video data for the videoconference. The computing device 900 may additionally or alternatively support presentation of a virtual representation of a user portion of a remote videoconference participant.

The methods, devices, systems, and logic described above, including the videoconferencing circuitry 212 and presentation circuitry 712, may be implemented in many different ways in many different combinations of hardware, software or both hardware and software. For example, all or parts of the videoconferencing circuitry 212 and/or presentation circuitry 712 may include circuitry in a controller, a microprocessor, or an application specific integrated circuit (ASIC), or may be implemented with discrete logic or components, or a combination of other types of analog or digital circuitry, combined on a single integrated circuit or distributed among multiple integrated circuits. All or part of the circuitry, systems, devices, and logic described above may be implemented as instructions for execution by a processor, controller, or other processing device and may be stored in a tangible or non-transitory machine-readable or computer-readable medium such as flash memory, random access memory (RAM) or read only memory (ROM), erasable programmable read, only memory (EPROM) or other machine-readable medium such as a compact disc read only memory (CDROM), or magnetic or optical disk. Thus, a product, such as a computer program product, may include a storage medium and computer readable instructions stored on the medium, which when executed in an endpoint, computer system, or other device, cause the device to perform operations according to any of the description above.

The processing capability of the systems, devices, and circuitry described herein, including the videoconferencing circuitry 212 and the presentation circuitry 712, may be distributed among multiple system components, such as among multiple processors and memories, optionally including multiple distributed processing systems. Parameters, databases, and other data structures may be separately stored and managed, may be incorporated into a single memory or database, may be logically and physically organized in many different ways, and may implemented in many ways, including data structures such as linked lists, hash tables, or implicit storage mechanisms. Programs may be parts (e.g., subroutines) of a single program, separate programs, distributed across several memories and processors, or implemented in many different ways, such as in a library, such as a shared library (e.g., a dynamic link library (DLL)). The DLL, for example, may store code that performs any of the system processing described above. While various embodiments have been described, it will be apparent to those of ordinary skill in the art that many more embodiments and implementations are possible.

Some example implementations have been described. Additional alternative implementations are possible.

The invention claimed is:

1. A device comprising:
videoconferencing circuitry to:
determine that a user portion of a user is not in a field of view of a camera by:
performing motion analysis of the user; and
determining departure of the user portion from the field of view of the camera and toward a display based on the motion analysis;

transmit video data captured by the camera to a remote videoconferencing device without the user portion of the user shown in the video data; and transmit a virtual representation indication to the remote videoconferencing device to cause a virtual representation of the user portion to be presented with the video data.

2. The device of claim 1, where the user portion comprises a hand of the user.

3. The device of claim 1, where the videoconferencing circuitry is further to:

obtain captured camera data with the user portion in the field of view of the camera;

identify a visual characteristic of the user portion in the captured camera data; and transmit the visual characteristic of the user portion to the remote device for use in presenting the virtual representation of the user portion.

4. The device of claim 1, further comprising:

a touchscreen display; and where the videoconferencing circuitry is to determine that the user portion of the user is not in the field of view of the camera by identifying a touch gesture on the touchscreen display.

5. The device of claim 4, where the videoconferencing circuitry is further to:

identify a touch characteristic of the touch gesture;

predict a visual characteristic of the user portion no longer in the field of view of the camera that accounts for the touch characteristic; and transmit the visual characteristic of the user portion to the remote videoconferencing device for use in presenting the virtual representation of the user portion.

6. The device of claim 5, where the touch characteristic comprises any combination of a time duration of the touch gesture, multiple simultaneous touches on the touchscreen display, and a distance between multiple touches on the touchscreen display.

7. A processor-implemented method comprising:

accessing video data of a user captured through a camera;

determining, for the captured video data, that a user portion of the user is not in a field of view of the camera by identifying a touch gesture has occurred on a touchscreen display;

augmenting the video data to include a virtual representation of the user portion of the user by:

identifying a touch characteristic of the touch gesture:

determining a touch location of the user portion that is not in the field of view of the camera based on the touch characteristic; and generating the virtual representation of the user portion at the touch location; and transmitting the video data augmented with the virtual representation of the user portion to a remote videoconferencing device.

8. The method of claim 7, where augmenting the video data to include the virtual representation of the user portion comprises:

identifying, from previously captured video data, a visual characteristic of the user portion; and generating the virtual representation of the user portion to include the visual characteristic.

9. The method of claim 7, where augmenting the video data to include the virtual representation of the user portion comprises:

determining a touch characteristic of the touch gesture;

predicting a shape of the user portion that is not in the field of view of the camera based on the touch characteristic; and generating the virtual representation of the user portion in the predicted shape.

10. A device comprising:

presentation circuitry to:

receive a virtual representation indication from a remote device, the virtual representation indication specifying that a hand portion of a remote user is out of a field of view of a remote camera of the remote device, wherein the remote device is to determine that the hand portion is out of the field of view by:

performing motion analysis of the remote user; and determining departure of the hand portion from the field of view of the camera and toward a display based on the motion analysis; and present, on a user interface, a virtual hand representation for the remote user in order to account for the hand portion that is out of the field of view of the remote camera.

11. The device of claim 10, where the presentation circuitry is to receive the virtual representation indication as video data augmented to include the virtual hand representation.

12. The device of claim 10, where:

the presentation circuitry is further to receive, from the remote device, a visual characteristic of the hand portion of the remote user that is out of the field of view of the remote camera; and the presentation circuitry is to present the virtual hand representation to include the visual characteristic.

* * * * *

UNITED STATES PATENT AND TRADEMARK OFFICE
CERTIFICATE OF CORRECTION

PATENT NO. : 9,948,894 B2  
APPLICATION NO. : 15/522006  
DATED : April 17, 2018  
INVENTOR(S) : Robert C Brooks et al.

Page 1 of 1

It is certified that error appears in the above-identified patent and that said Letters Patent is hereby corrected as shown below:

In the Drawings

In Figure 3, Sheet 3 of 9, reference numeral 212, Line 1, delete "Circuity" and insert -- Circuitry --, therefor.

In Figure 4, Sheet 4 of 9, reference numeral 212, Line 1, delete "Circuity" and insert -- Circuitry --, therefor.

In Figure 5, Sheet 5 of 9, reference numeral 212, Line 1, delete "Circuity" and insert -- Circuitry --, therefor.

In Figure 8, Sheet 8 of 9, reference numeral 802, Line 1, delete "presentation" and insert -- representation --, therefor.

In the Claims

In Column 11, Lines 46-47, in Claim 7, delete "gesture:" and insert -- gesture; --, therefor.

Signed and Sealed this  
Twenty-eighth Day of August, 2018

Andrei Iancu  
*Director of the United States Patent and Trademark Office*